United States Patent
Bi et al.

(10) Patent No.: US 12,376,715 B2
(45) Date of Patent: Aug. 5, 2025

(54) SPLIT-TYPE FOOTREST

(71) Applicant: Tiedeping Hardware Plastic (Shenzhen) Co., Ltd., Guangdong (CN)

(72) Inventors: Xiaofeng Bi, Guangdong (CN); Dongfang Chen, Guangdong (CN)

(73) Assignee: TIEDEPING HARDWARE PLASTIC (SHENZHEN) CO., LTD., Guangdong (CN)

( * ) Notice: Subject to any disclaimer, the term of this patent is extended or adjusted under 35 U.S.C. 154(b) by 0 days.

(21) Appl. No.: 18/423,023

(22) Filed: Jan. 25, 2024

(65) Prior Publication Data
US 2025/0026435 A1  Jan. 23, 2025

(30) Foreign Application Priority Data
Apr. 27, 2023 (CN) .......................... 202321009243.2

(51) Int. Cl.
A47K 17/02 (2006.01)
B62M 3/08 (2006.01)

(52) U.S. Cl.
CPC ............. *A47K 17/024* (2013.01); *B62M 3/08* (2013.01)

(58) Field of Classification Search
CPC ... B62M 3/08; G05G 1/60; B62J 25/04; B62J 25/06
See application file for complete search history.

(56) References Cited

U.S. PATENT DOCUMENTS

| | | | | |
|---|---|---|---|---|
| 2,314,713 A | * | 3/1943 | Kirch | F16B 47/00 156/391 |
| 3,969,953 A | * | 7/1976 | Sponberg | G05G 1/483 74/563 |
| 4,264,132 A | * | 4/1981 | Konzorr | B62M 3/12 359/521 |
| 4,638,682 A | * | 1/1987 | Michiyama | B62M 3/08 74/564 |

(Continued)

FOREIGN PATENT DOCUMENTS

| | | | | |
|---|---|---|---|---|
| CN | 110023182 B | * | 2/2021 | B60N 2/40 |
| CN | 218606307 U | | 3/2023 | |

(Continued)

OTHER PUBLICATIONS

Machine translation of CN 218606307 U, Mar. 14, 2023 (Year: 2023).*

*Primary Examiner* — Daniel D Yabut
(74) *Attorney, Agent, or Firm* — MUNCY, GEISSLER, OLDS & LOWE, P.C.

(57) ABSTRACT

A split-type footrest includes a sucker, a shell and a foot-pedal. The shell is fixedly connected to the sucker. The shell is provided with at least one snapping part. The foot-pedal is correspondingly provided with a hanging arm, and the head of the hanging arm is provided with a lug. The lug is used to be inserted into the snapping part so as to form a detachable snap connection. There are snapping parts symmetrically provided on both sides of the shell respectively. There are two hanging arms and they are arranged on both sides of the foot-pedal respectively. Each hanging arm is provided with a lug, and each lug extends toward the other lug. The lugs are in one-to-one correspondence with the snapping parts. The foot-pedal and the main body can be disassembled for separate transportation.

7 Claims, 4 Drawing Sheets

(56) References Cited

U.S. PATENT DOCUMENTS

| | | | | |
|---|---|---|---|---|
| 6,244,778 B1 * | 6/2001 | Chesbrough | ............ | A47G 1/17 |
| | | | | 403/57 |
| 7,287,773 B1 * | 10/2007 | Stahel | ...................... | B62J 25/04 |
| | | | | 280/288.4 |
| 8,083,248 B1 * | 12/2011 | Gulley | ..................... | B62J 25/04 |
| | | | | 248/688 |
| 9,540,066 B1 * | 1/2017 | Bloomer | .................. | B62J 25/04 |
| 2006/0086202 A1 * | 4/2006 | Barlow | .................. | A61G 5/128 |
| | | | | 74/564 |
| 2007/0163039 A1 * | 7/2007 | Lee | ........................ | A47K 3/281 |
| | | | | 4/574.1 |

FOREIGN PATENT DOCUMENTS

| | | | | | |
|---|---|---|---|---|---|
| GB | | 239022 A | * | 9/1925 | |
| WO | WO-03041548 A1 | * | 5/2003 | ............. | A47K 3/125 |

\* cited by examiner

SPLIT-TYPE FOOTREST

TECHNICAL FIELD

The present disclosure relates to a bathroom/restroom article, and in particular to a split-type footrest.

BACKGROUND ART

Footrests used in bathrooms/restrooms are usually fixed on the wall to facilitate users to wash or care for their calves and feet. Existing footrests are usually fixed to wall surfaces through screws, adhesives or suckers. CN 218606307U discloses a sucker type footrest, in which a foot-pedal is directly articulated to a pull rod of a sucker. The foot-pedal can directly operate the pull rod. However, due to the non-detachable connection between the foot-pedal and the pull rod, even the foot-pedal can also be rotated and folded, the volume occupied after folding is still large, and the cost of bulk transportation is high, which needs to be improved.

SUMMARY

The purpose of the present disclosure is to overcome the above defect of the prior art, and provide a split-type footrest, which allows its foot-pedal to be detached from its main body, so as to reduce the cost of bulk transportation.

In order to achieve the above purpose, the present disclosure uses the following technical solution: a split-type footrest, which includes a sucker, a shell and a foot-pedal. The shell is fixedly connected to the sucker. The shell is provided with at least one snapping part. The foot-pedal is correspondingly provided with a hanging arm, and the head of the hanging arm is provided with a lug. The lug is used to be inserted into the snapping part so as to form a detachable snap connection.

Compared with the prior art, the beneficial effect of the present disclosure is as follows: the lug is detachably snapped into the snapping part of the shell, and the shell is fixed to the sucker, so that a detachable connection between the foot-pedal and the main body is formed. During bulk transportation, the foot-pedal and the main body can be disassembled for separate transportation, thereby reducing the cost of bulk transportation, which is beneficial to reducing the sales cost of the product.

Further, there are snapping parts symmetrically provided on both sides of the shell respectively. There are two hanging arms and they are arranged on both sides of the foot-pedal respectively. Each hanging arm is provided with a lug, and each lug extends toward the other lug. The lugs are in one-to-one correspondence with the snapping parts.

Further, a front wall of the snapping part is provided with a semicircular groove, and a rear wall of the snapping part is a front shell of the sucker. The cross section of the lug is in a shape of a water drop, and the lug is divided into a circular portion and a triangular portion. When the lug is snapped into the snapping part, the outer corner of the triangular portion abuts against the front shell of the sucker and the triangular portion presses the circular portion of the lug tightly into the semicircular groove.

Further, there is an entrance for the snapping part between the upper end of the semicircular groove and the front shell of the sucker. The width of the entrance is smaller than the farthest distance from the outer corner of the triangular portion of the lug to the circular portion.

Further, the width of the entrance is equal to the diameter of the circular portion of the lug.

Further, an escape groove is provided below the snapping part. The escape groove is used to accommodate the triangular portion of the lug during the process of inserting the lug into the snapping part or removing the lug from the snapping part.

Further, the sucker is of manual air suction type.

Further, the shell is fixedly connected to the sucker through screws.

The above description is merely an overview of the technical solution of the present disclosure. In order to understand the technical means of the present disclosure more clearly, it can be implemented in accordance with the content of the specification, and in order to make the above and other purposes, features and advantages of the present disclosure more obvious and easier to understand, preferred embodiments are specifically cited below, which are described in detail as follows.

DETAILED DESCRIPTION OF EMBODIMENTS

In order to make the purpose, technical solution and advantages of the present disclosure clearer, the present disclosure will be further described in detail below with reference to the accompanying drawings and specific embodiments.

The technical solution in the embodiments of the present disclosure will be clearly and completely described below in conjunction with the accompanying drawings of the embodiments of the present disclosure; and obviously, the embodiments described are merely some, rather than all, of the embodiments of the present disclosure. All other embodiments obtained by those skilled in the art based on the embodiments of the present disclosure without any creative effort shall fall within the protection scope of the present disclosure.

An embodiment of the present disclosure is a split-type footrest, and its specific structure is shown in FIGS. 1 to 4.

Figure 1:
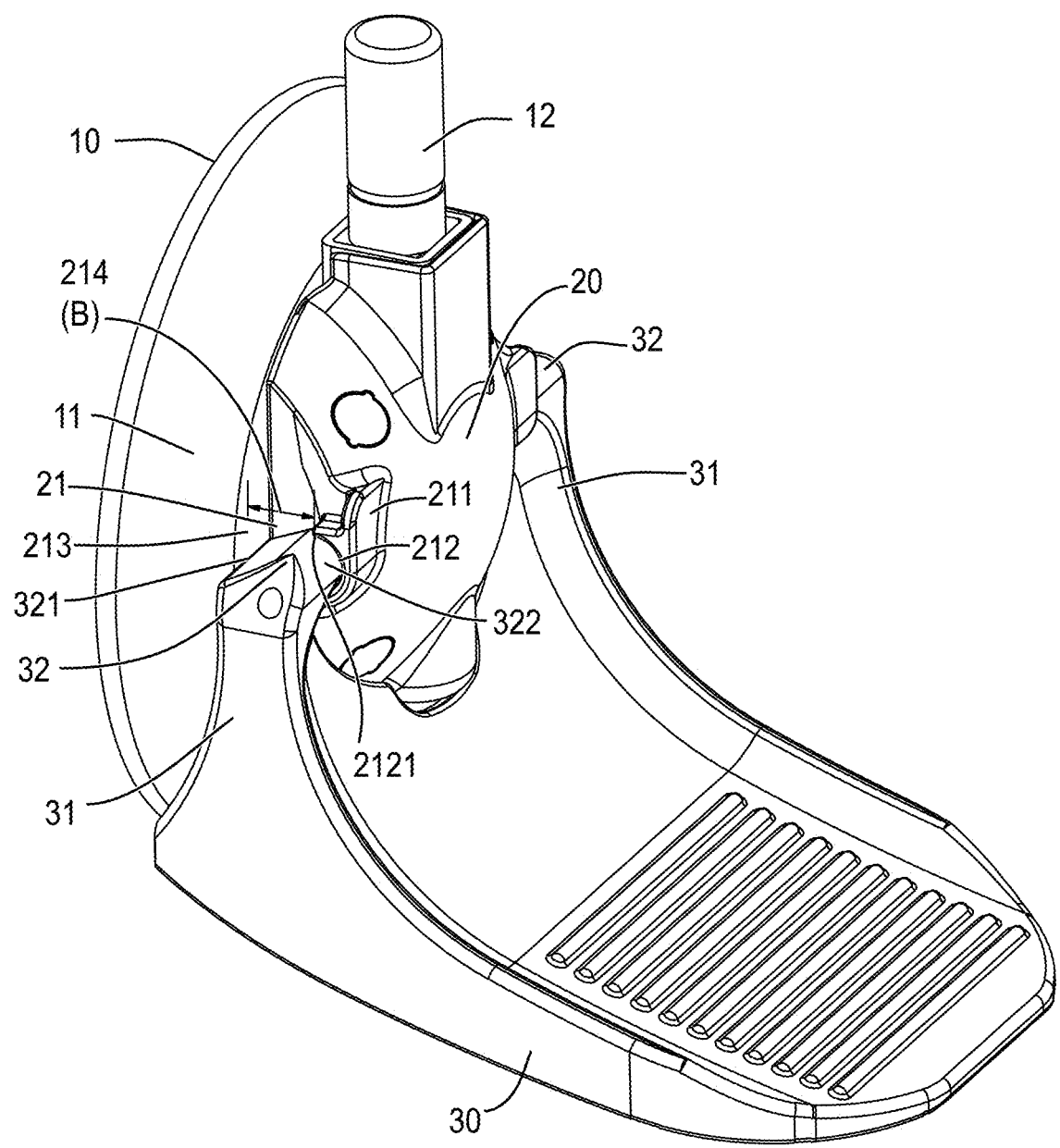
FIG. 1 is a three-dimensional view of a split-type footrest that is assembled according to the present disclosure.
Figure 2:
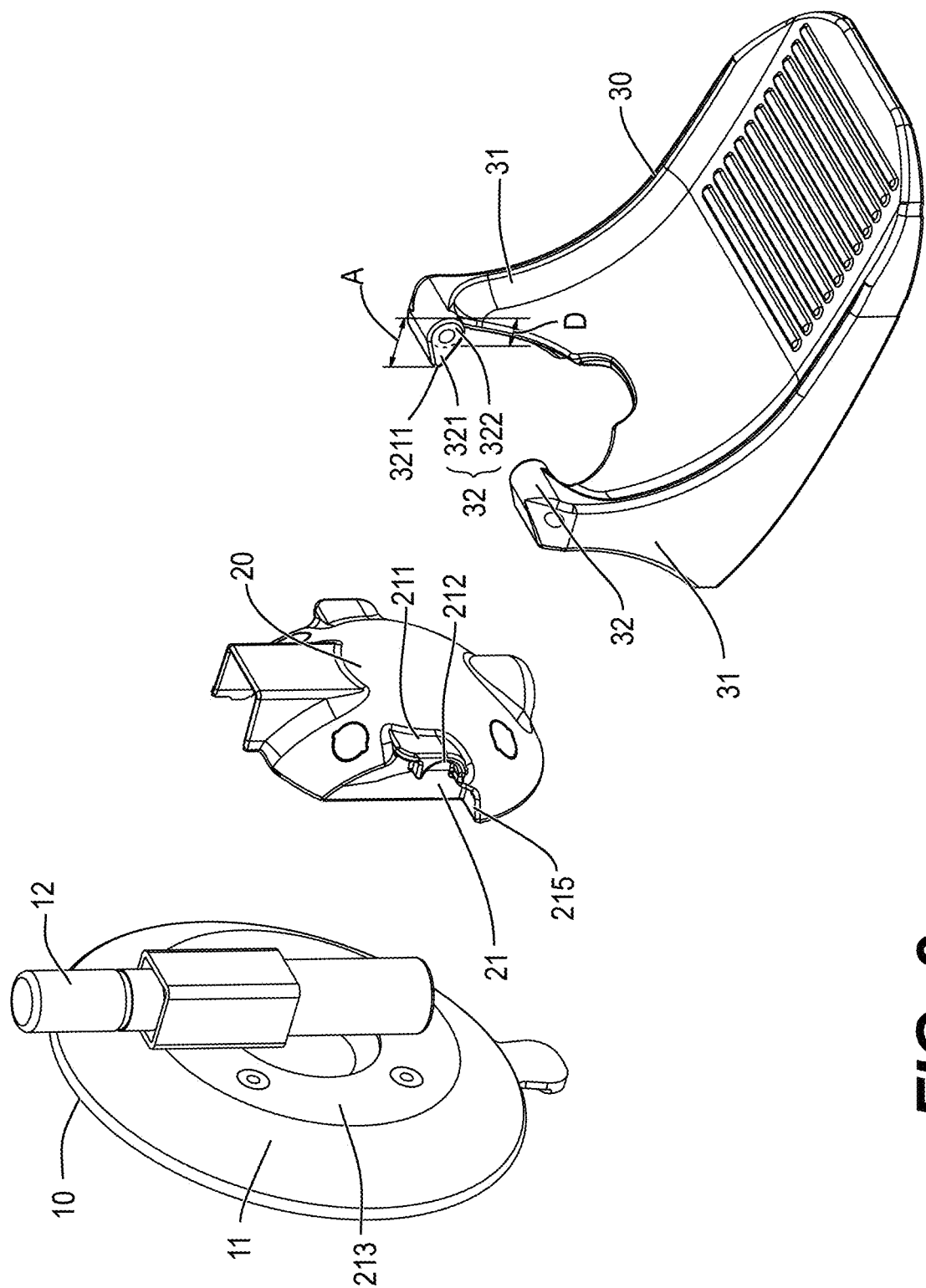
FIG. 2 is an exploded view of a split-type footrest according to the present disclosure.

As shown in FIGS. 1 and 2, the split-type footrest includes a sucker 10, a shell 20 and a foot-pedal 30. The sucker 10 is of manual air suction type, and a front shell 11 of the sucker 10 is provided with a pressing handle 12. The shell 20 is fixedly connected to the sucker 10 through four screws. The shell 20 is provided with two snapping parts 21, and the snapping parts 21 are symmetrically arranged on both sides of the shell 20. The foot-pedal 30 is correspondingly provided with hanging arms 31, and heads of the hanging arms 31 are provided with lugs 32. The lugs 32 are used to be inserted into the snapping parts 21 so as to form a detachable snap connection. In this embodiment, there are two hanging arms 31 and they are symmetrically arranged on both sides of the foot-pedal 30 respectively. Each hanging arm 31 is provided with a lug 32, and each lug 32 extends toward the other lug 32. The lugs 32 are in one-to-one correspondence with the snapping parts 21.

In other embodiments, it is possible to provide only one snapping part, and one lug of the foot-pedal is provided correspondingly, so that a larger hanging arm is required so as to provide sufficient strength.

As shown in FIGS. 1 and 2, a front wall 211 of the snapping part 21 is provided with a semicircular groove 212, and a rear wall 213 of the snapping part 21 is the front shell 11 of the sucker 10. As shown in FIG. 2, the lug 32 is divided into a circular portion 322 and a triangular portion 321 that form a water drop shape as combined. When the lug 32 is snapped into the snapping part 21, the outer corner 3211 of the triangular portion 321 abuts against the front shell 11 of the sucker 10 and the triangular portion 321 presses the circular portion 322 of the lug 32 tightly into the semicircular groove 212, such that the lug 32 is pressed tightly by the snapping part 21, so the foot-pedal 30 will not shake easily.

As shown in FIG. 1, there is an entrance 214 for the snapping part 21 between the upper end 2121 of the semicircular groove 212 and the front shell 11 of the sucker 10. The width B of the entrance 214 is smaller than the farthest distance (width A in FIG. 2) from the outer corner of the triangular portion 321 of the lug 32 to the circular portion 322. In this embodiment, the width of the entrance 214 is equal to the diameter D of the circular portion 322 of the lug 32, so that the circular portion 322 of the lug 32 can be allowed to enter and exit from the entrance 214.

As shown in FIG. 2, an escape groove 215 is provided below the snapping part 21. The escape groove 215 is used to accommodate the triangular portion 321 of the lug 32 during the process of inserting the lug 32 into the snapping part 21 or removing the lug 32 from the snapping part 21.

Figure 3:
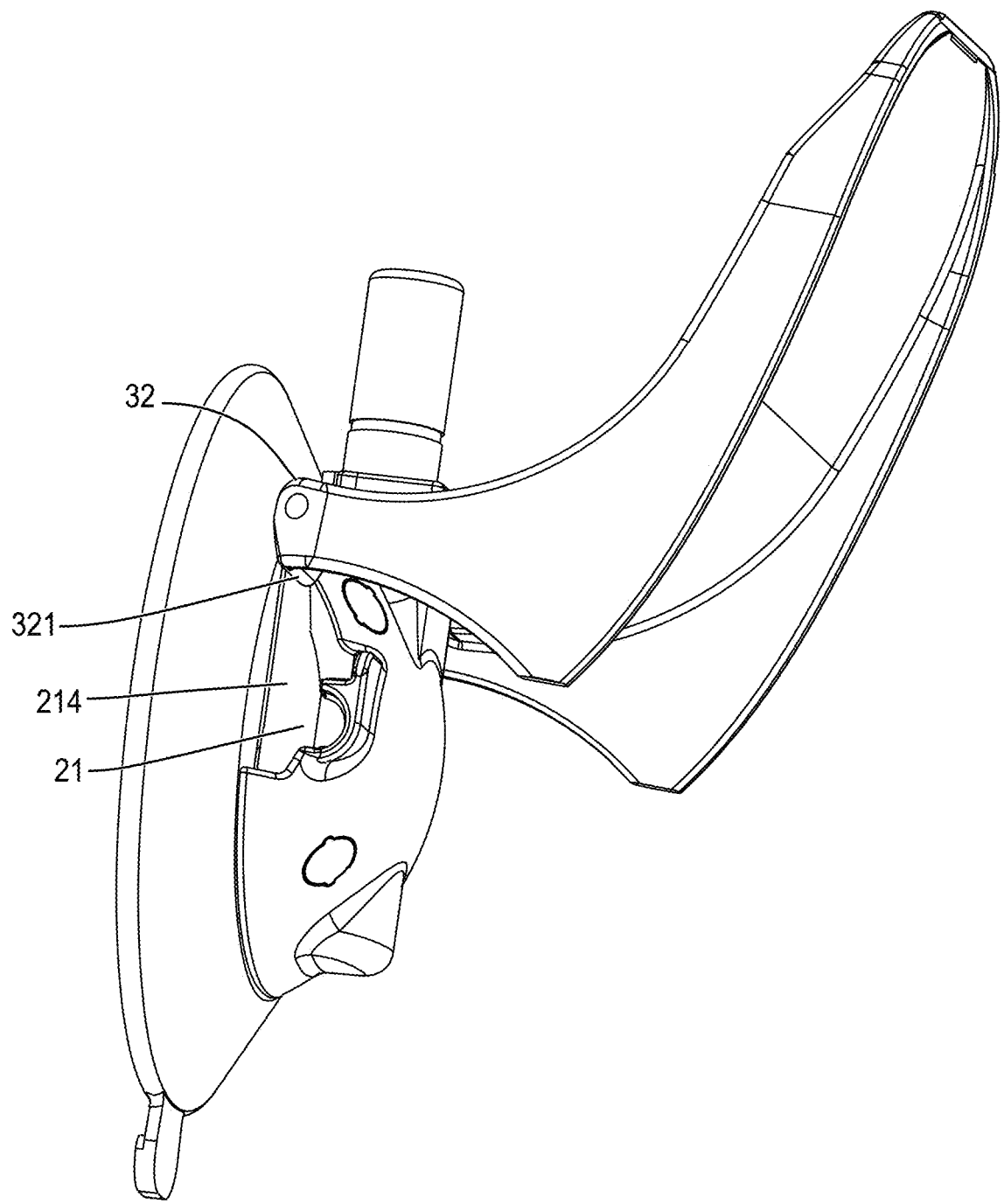
FIG. 3 is a view of a pedal when it is not inserted into a snapping part according to the present disclosure.
Figure 4:
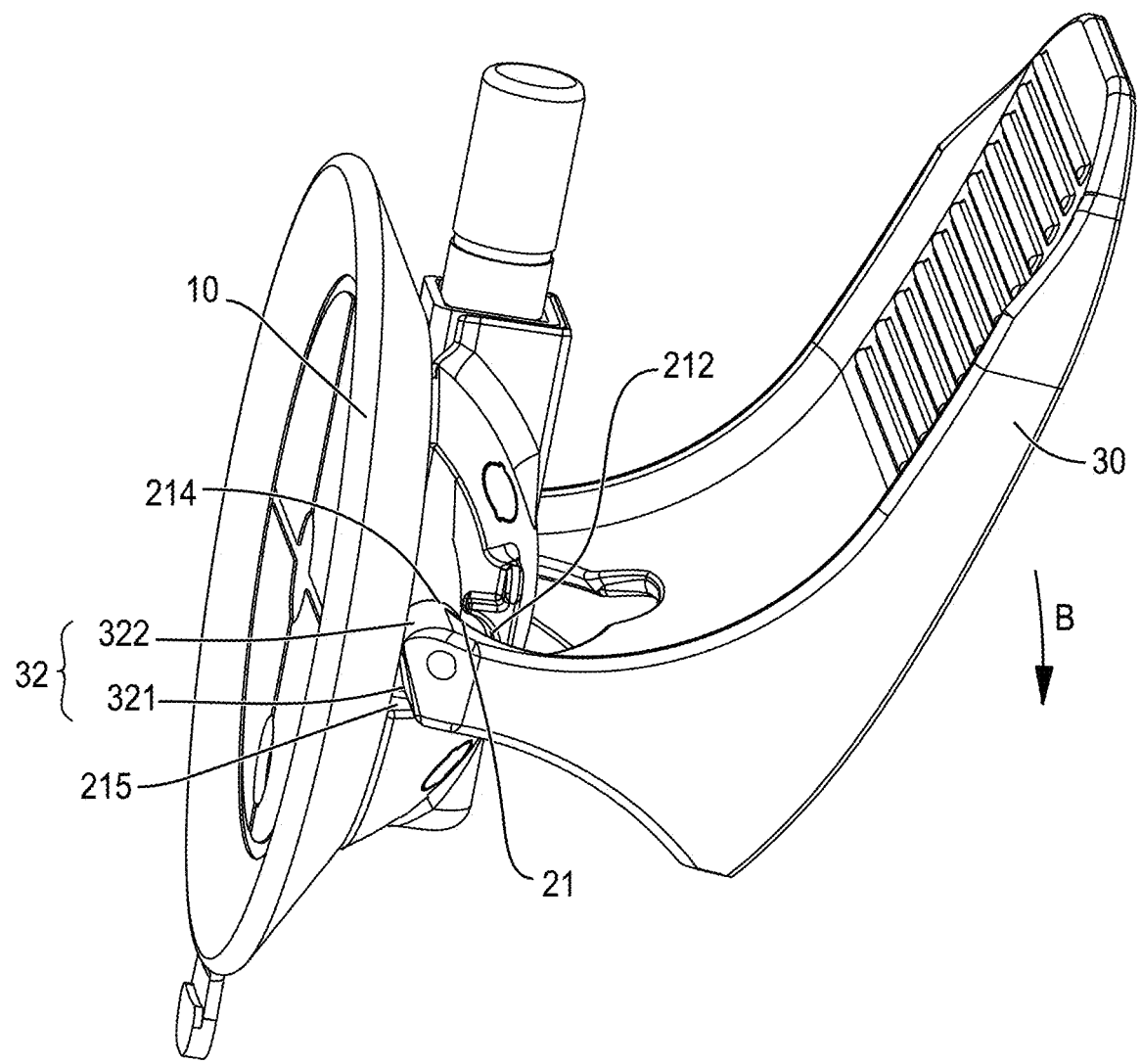
FIG. 4 is a view of a pedal when it is inserted into a snapping part according to the present disclosure.

When the foot-pedal 30 needs to be installed, as shown in FIG. 3, the triangular portion 321 of the lug 32 is directed toward the entrance 214 of the snapping part 21, and then the lug 32 is inserted into the snapping part 21 from up to down until the circular portion 322 of the lug 32 crosses the entrance 214 of the snapping part 21, reaching the state as shown in FIG. 4, and meanwhile the triangular portion 321 of the lug 32 is placed in the escape groove 215. In FIG. 4, the foot-pedal 30 moves along direction B, so that the triangular portion 321 of the lug 32 moves upward against the front shell 11 of the sucker 10, and the circular portion 322 of the lug 32 will be screwed into the semicircular groove 212, finally reaching the state shown in FIG. 1. When the foot-pedal 30 needs to be detached, the foot-pedal 30 is rotated in an opposite direction of direction B to the state shown in FIG. 4, and then the foot-pedal 30 is moved up to be disengaged from the snapping part 21 so that the foot-pedal 30 can be detached.

In the present disclosure, the lugs 32 are detachably snapped into the snapping parts 21 of the shell 20, and the shell 20 is fixed to the sucker 10, so that a detachable connection between the foot-pedal 30 and the main body is formed. During bulk transportation, the foot-pedal 30 and the main body can be disassembled for separate transportation, thereby reducing the cost of bulk transportation, which is beneficial to reducing the sales cost of the product.

In the description of the present disclosure, it should be understood that the orientation or positional relationship indicated by terms "center", "longitudinal", "transverse", "length", "width", "thickness", "upper", "lower", "front", "rear", "left", "right", "vertical", "horizontal", "top", "bottom", "inside", "outside", "clockwise", "counterclockwise" and the like is based on the orientation or positional relationship shown in the drawings, which is merely for the convenience of describing the present disclosure and for the simplification of the description, and not to indicate or imply that the means or element referred to must have a specific orientation, be constructed and operated in a specific orientation. Therefore, the above terms shall not be construed as a limitation of the present disclosure.

In the present disclosure, unless otherwise explicitly specified and limited, a first feature being "above" or "below" a second feature may include situations where the first feature and the second feature are in direct contact, and the first feature and the second feature are not in direct contact but are in contact through another feature between them. Moreover, a first feature being "on", "above" or "over" a second feature includes situations where the first feature is directly above or obliquely above the second feature, or simply indicates that the horizontal level of the first feature is higher than that of the second feature. A first feature being "under", "below", and "beneath" a second feature includes situations where the first feature is directly below or obliquely below the second feature, or simply indicates that the horizontal level of the first feature is lower than that of the second feature.

In the description of this specification, descriptions with reference to terms "one embodiment", "some embodiments", "an example", "a specific example", or "some examples" etc., mean specific features, structures, materials or characteristics described in conjunction with the embodiment(s) or example(s) are included in at least one embodiment or example of the present disclosure. In this specification, the schematic representation of the above-mentioned terms should not be constructed as necessarily referring to the same embodiment or example. Moreover, the described specific features, structures, materials or characteristics may be combined in any one or more embodiments or examples in a suitable manner. In addition, those skilled in the art may combine different embodiments or examples described in this specification.

The above only uses embodiments to further illustrate the technical content of the present disclosure, so as to make it easier for readers to understand, but it does not mean that the implementation of the present disclosure is limited to this. Any technical extension or re-creation made in accordance with the present disclosure is all protected by the present disclosure. The protection scope of the present disclosure is defined by the claims.

The invention claimed is:

1. A split footrest, comprising a sucker, a shell and a foot-pedal, wherein the shell is fixedly connected to the sucker, the shell is provided with at least one snapping part, the foot-pedal is correspondingly provided with a hanging arm, a head of the hanging arm is provided with a lug, and the lug is used to be inserted into the snapping part so as to form a detachable snap connection, wherein a front wall of the snapping part is provided with a semicircular groove, a rear wall of the snapping part is a front shell of the sucker, the lug is divided into a circular portion and a triangular portion that form a water drop shape as combined, and when the lug is snapped into the snapping part, the outer corner of the triangular portion abuts against the front shell of the sucker and the triangular portion presses the circular portion of the lug tightly into the semicircular groove.

2. The split footrest of claim 1, wherein there are snapping parts symmetrically provided on both sides of the shell respectively, there are two hanging arms that are symmetrically arranged on both sides of the foot-pedal respectively, each hanging arm is provided with a lug, each lug extends toward the other lug, and the lugs are in one-to-one correspondence with the snapping parts.

3. The split footrest of claim 1, wherein there is an entrance for the snapping part between the upper end of the semicircular groove and the front shell of the sucker, and the width of the entrance is smaller than the farthest distance from the outer corner of the triangular portion of the lug to the circular portion.

4. The split footrest of claim 3, wherein the width of the entrance is equal to the diameter of the circular portion of the lug.

5. The split footrest of claim 1, wherein an escape groove is provided below the snapping part, and the escape groove is used to accommodate the triangular portion of the lug during the process of inserting the lug into the snapping part or removing the lug from the snapping part.

6. The split footrest of claim 1, wherein the sucker is a manual air sucker.

7. The split footrest of claim 1, wherein the shell is fixedly connected to the sucker.

\* \* \* \* \*